United States Patent

Thanigasalam

(10) Patent No.: US 8,867,683 B2
(45) Date of Patent: Oct. 21, 2014

(54) RECEIVER AND METHOD FOR SYNCHRONIZING AND ALIGNING SERIAL STREAMS

(75) Inventor: Haran Thanigasalam, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1676 days.

(21) Appl. No.: 11/340,438

(22) Filed: Jan. 27, 2006

(65) Prior Publication Data

US 2007/0177701 A1 Aug. 2, 2007

(51) Int. Cl.
*H04L 7/00* (2006.01)
*H04J 3/06* (2006.01)
*H04L 7/02* (2006.01)
*H04J 3/07* (2006.01)

(52) U.S. Cl.
CPC . *H04L 7/02* (2013.01); *H04J 3/062* (2013.01); *H04J 3/073* (2013.01)
USPC ............................. 375/372; 375/354; 375/371

(58) Field of Classification Search
USPC ............... 375/372, 371, 354; 2/372, 371, 354
See application file for complete search history.

(56) References Cited

U.S. PATENT DOCUMENTS

| | | | |
|---|---|---|---|
| 6,088,413 A * | 7/2000 | Autry et al. | 375/372 |
| 6,091,705 A * | 7/2000 | Regula | 370/223 |
| 6,594,329 B1 | 7/2003 | Susnow | |
| 6,725,388 B1 | 4/2004 | Susnow | |
| 2003/0099231 A1 * | 5/2003 | Betts et al. | 370/369 |
| 2003/0165277 A1 * | 9/2003 | Ohashi et al. | 382/305 |
| 2005/0010701 A1 * | 1/2005 | Elboim | 710/52 |
| 2005/0144341 A1 | 6/2005 | Schmidt et al. | |

* cited by examiner

*Primary Examiner* — Michael Neff

(57) ABSTRACT

A receiver for receiving a stream of symbols clocked at a first rate, and providing the symbols at a second clock rate uses two buffers. Incoming symbols are written to a first dual clock buffer at the first rate, and read from the first and second buffer, at the second rate. Underflow of the first buffer is signaled to the second buffer, thereby avoiding the need to insert defined clock compensation symbols at the second rate. Symbols received at the second buffer while underflow is signaled may be ignored. Conveniently, the second buffer may also be used to align symbol data across multiple symbol streams using periodic alignment symbols. An exemplary embodiment conforms to the PCI Express standard.

36 Claims, 7 Drawing Sheets

RECEIVER AND METHOD FOR SYNCHRONIZING AND ALIGNING SERIAL STREAMS

FIELD OF THE INVENTION

The present invention relates generally to digital circuits and more particularly to methods and circuits used in the synchronization of serial streams with a local clock, and the alignment of multiple streams.

BACKGROUND OF THE INVENTION

Synchronous digital circuits use a single timing reference to drive an entire circuit. However, synchronous clocking of large digital circuits or systems including multiple circuits can be expensive and complex as clock distribution becomes more and more difficult. Instead, large digital circuits are typically partitioned into subsystems. Each subsystem generates its own local clock. Data communication between different subsystems takes place asynchronously. If all local clocks are near a system clock, the circuits are called plesiochronous circuits. In such circuits, local clocks are typically within a few hundred parts per million (ppm) of the system clock.

An example of a plesiochronous circuit/system is a PCI Express transmitter/receiver pair interconnecting two PCI Express compliant devices. PCI Express is described in PCI Express Base Specification, Revision 1.0a, the contents of which are hereby incorporated by reference. As detailed therein, each PCI Express device has its own local clock. Devices exchange data by way of serial lines, referred to as lanes. Each lane carries a serial bit stream using a pair of differential signals. Several lanes are combined to form a PCI Express link.

A clock is embedded within each serial bit stream using the 8B/10B encoding scheme. The use of differential signals is advantageous because it offers better noise immunity from electromagnetic interference (EMI).

Embedding the clock in the data stream using 8B/10B allows a reduction in pin count as a dedicated clock line is avoided. However, as a separate clock is embedded in each lane, the lanes are not synchronized to each other, and the multiple receiver/transmitters operate in a plesiochronous manner.

Advantageously, unlike in a synchronous link, the length of traces used by the lanes need not be matched. However, as with all plesiochronous circuits, the received (recovered) clock is not the same as the local clock at the receiver. The deviation of the recovered clock from the local clock is called clock jitter. The clock jitter must be compensated for in the receiver design.

To this end, recovery of the embedded clock signal from the received serial stream is typically achieved by using a phase-locked-loop (PLL) circuit that extracts the clock using the frequent 1-to-0 and 0-to-1 logic level transitions guaranteed by the 8B/10B coding.

Once the embedded clock is recovered from the bit stream, the recovered clock (Rx Clock) may be used to write the transmitted bits into a plesiochronous elastic store (PES)—an elastic buffer circuit that operates using separate clocks for writing to and reading from the buffer. Such an elastic buffer circuit allows transmitter and receiver using different clocks to smoothly exchange data. The recovered clock is used to write to the elastic buffer. A local clock is used to clock out the bits from the elastic buffer (PES) and from then on, the data is synchronized to the rest of the receiver circuit.

As there can be a difference of up to a few hundred ppm in the frequencies of the recovered clock and the local clock, an overflow or an underflow may occur if there is a mismatch between the clock used to read (the local clock) from the buffer and the clock used to write (the recovered clock) to the buffer.

Overflow and underflow is compensated by "bit-stuffing"—that is, the transmitter periodically sends clock compensation sequences within the data stream. The elastic buffer deletes these sequences when the buffer is about to become full. Conversely the elastic buffer inserts clock compensation sequences, if the buffer is about to run out of data. Clock compensation sequences are later removed from the data stream.

These requirements make the design of the elastic buffer complex. The elastic buffer needs to detect imminent underflows and overflows; detect clock compensation sequences; insert clock compensation sequences; delete clock compensation sequences and perform related tasks. Moreover, these functions must be accomplished in two clock domains—one clock domain for the circuitry associated with writing to the buffer and a different one for reading from the buffer. This often leads to a complex state machine for the elastic buffer which in turn uses many gates to implement and may consume more clock cycles in operation.

A PCI Express receiver must also address the problem of lane-to-lane synchronization, referred to as lane skew, in addition to clock recovery and synchronization with the local clock. Specifically, when a multi-lane link is used to transmit data, symbols on different lanes arrive at different times, even when they are transmitted simultaneously, due to traces having different lengths, impedance differences, and the like. The receiver thus, needs to recognize data that was transmitted simultaneously on different lanes, and align them in order to reconstruct the transmitted packet accurately at the receiver.

Accordingly, there remains a need for a simplified receiver capable of synchronizing incoming data streams with the local clock and accurately processing the received data.

SUMMARY OF THE INVENTION

In accordance with the present invention, a stream of symbols clocked at a first rate, may be provided at a second rate using two buffers. Symbols are written to a first buffer at the first rate, and read from the first and second buffer, at the second rate. Underflow of the first buffer is signaled to the second buffer, thereby avoiding the need to insert defined clock compensation symbols at the second rate. Symbols received at the second buffer while underflow is signaled may be ignored. Conveniently, the second buffer may also be used to align symbol data across multiple symbol streams using periodic alignment symbols.

In accordance with an aspect of the present invention, there is provided a receiver for providing symbols at a second clock rate from an incoming stream of symbols clocked at a first clock rate, comprising a first buffer for storing symbols in the incoming stream at the first clock rate; a first buffer control circuit for providing symbols stored in the first buffer and placeholder symbols at the second clock rate, and an indicator of whether a provided symbol is a placeholder symbol, such that the placeholder symbols are provided when insufficient symbols are stored within the first buffer. The receiver also includes a second buffer for storing symbols corresponding to the symbols provided from the first buffer; and a second buffer control circuit for receiving the indicator and inhibiting placeholder symbols from entering the second buffer, and providing the corresponding symbols from the second buffer at the second clock rate.

In accordance with an aspect of the present invention, there is provided a method of synchronizing an incoming stream of symbols clocked at a first clock rate, to a second clock rate, including receiving the stream in a first buffer at the first clock rate; providing the symbols stored in the first buffer and placeholder symbols at the second clock rate, and an indicator of whether a provided symbol is a placeholder symbol. The placeholder symbols are provided when insufficient symbols are stored within the first buffer. The method further includes storing symbols corresponding to the symbols provided from the first buffer, in a second buffer and inhibiting placeholder symbols from being stored in the second buffer. The method also includes providing the corresponding symbols stored in the second buffer at the second clock rate.

In accordance with yet another aspect of the present invention there is provided, a circuit for removing skew among a plurality of symbol streams with each symbol stream including periodic alignment symbols. The circuit includes a plurality of buffers, each used to buffer symbols within one of the symbol streams; a plurality of read pointers each identifying a location of one of the buffers from which data is to be read; control logic to detect placeholder symbols in each of the symbol streams, and prevent the placeholder symbols from being stored in an associated buffer; and alignment logic for aligning the read pointers to concurrently point to the periodic alignment symbols in each of the buffers.

In accordance with yet another aspect of the present invention there is provided, a method of removing skew among a plurality of symbol streams with each symbol stream including periodic alignment symbols. The method includes buffering symbols within each of the symbol streams in a plurality of buffers; detecting placeholder symbols in each of the symbol streams, and preventing the placeholder symbols from being stored in an associated buffer; identifying a location of the buffers from which data is to be read using a plurality of read pointers associated the buffers; and aligning the read pointers to concurrently point to the periodic alignment symbols in each of the buffers in response to an alignment condition being met.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
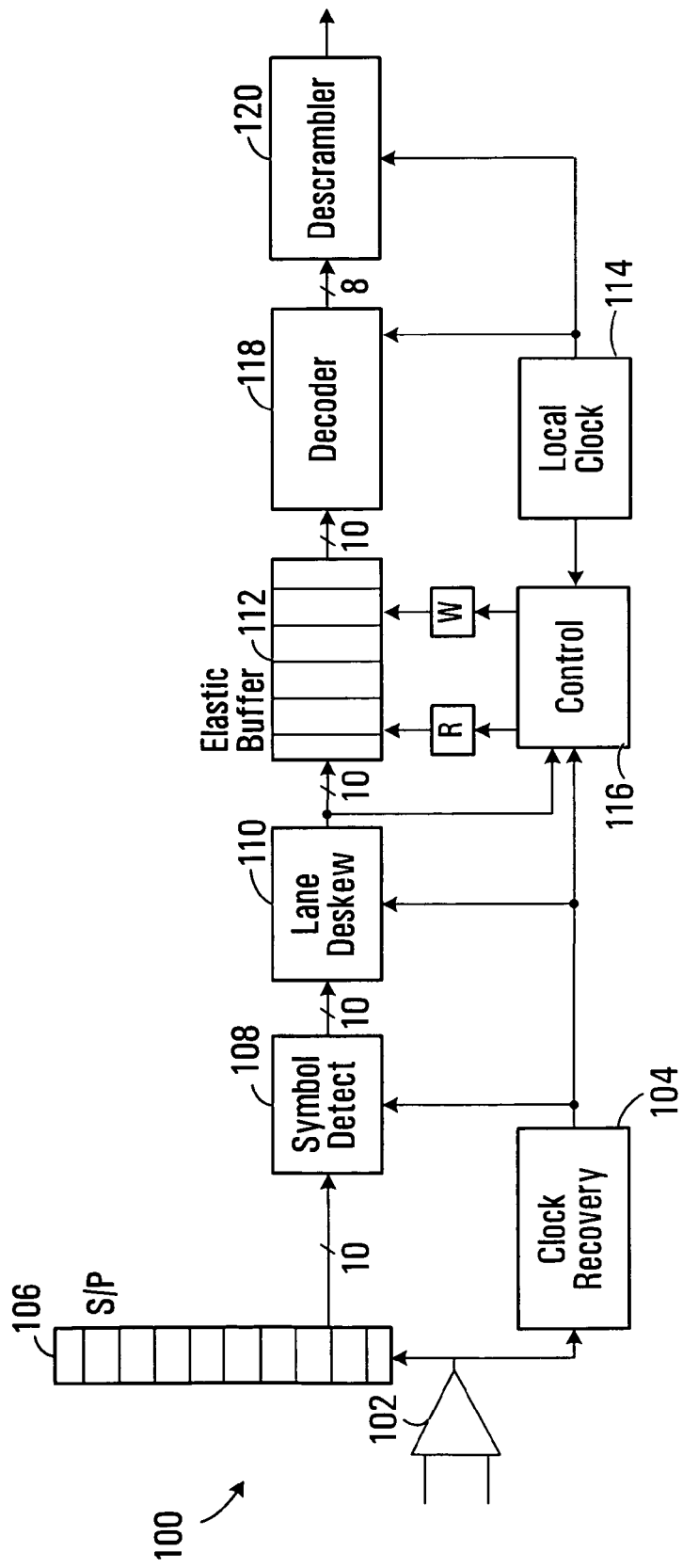
FIG. 1 is a block diagram of a conventional receiver subsystem of a PCI Express compliant device.

FIG. 1 schematically depicts a conventional PCI Express compliant receiver subsystem 100. Subsystem 100 is representative of the receiver for a single lane in a PCI Express link. A PCI Express compliant device thus includes multiple receiver subsystems, like subsystem 100.

As illustrated, subsystem 100 includes a differential receiver 102, to receive a differential signal provided by a complementary subsystem of a PCI Express compliant transmitter (not illustrated). Differential receiver 102 converts the incoming differential voltage on a lane to a serial bit stream. The bit stream is an 8B/10B encoded binary serial data stream which includes sufficiently frequent transitions from '1' to '0' and '0' to '1', to enable extraction of an embedded clock. The output of differential receiver 102 is provided to a clock recovery circuit 104, and a serial-to-parallel converter 106.

Serial-to-parallel (S/P) converter 106 and symbol detector 108 cooperate to convert the input bit stream into 10-parallel bit symbols and provide the symbols to lane de-skew circuit 110. S/P converter 106 buffers multiple bits of the arriving stream, and outputs a 10-bit window of the stream. Symbol detector 108 receives and buffers the 10-bit output of S/P converter 106. Symbol detector 108 attempts to detect a valid symbol from a 10-bit window of its buffered bits.

A reserved 10-bit symbol referred to as the comma (COM) symbol, sent by the transmitter is used for the purpose of detecting a valid symbol. Upon successful detection of one or more COM symbols in the same window position, symbol detector 108 achieves symbol lock, and outputs delineated 10 bit symbols (bits in its 10-bit window of its buffer) to the lane de-skew circuit 110. Once a symbol boundary is detected, a control signal to lane de-skew circuit 110 is asserted by symbol detector 108 in order to maintain the symbol lock and to alert lane de-skew circuit 110 when symbol lock is lost.

Lane de-skew circuit 110 aligns symbols across multiple lanes within a link, so that symbols transmitted concurrently along multiple lanes within a link at the transmitter are processed simultaneously at the receiver. Lane de-skew circuit 110 includes a first-in-first-out (FIFO) buffer associated with each lane. The symbol stream from each lane is written into the associated FIFO of each lane. Lane de-skew circuit 110 controls when symbols are read out of each FIFO. Thus, lane de-skew circuit 110 can introduce the appropriate delay to each lane to ensure alignment.

Lane de-skew circuit 110 makes use of special sequences of reserved symbols that are transmitted in each lane, along with data to achieve alignment. Examples reserved symbols include COM, detailed above; and symbols identified as a skip (SKP) symbol; TS1 symbol; TS2 symbol and FTS symbol, as all detailed in the PCI Express Base Specification. Predefined sequences of these reserved symbols are used in a PCI Express receiver to initialize a link and maintain alignment of symbols across the lanes of a given link. These sequences of reserved symbols are known as 'ordered-sets'. Ordered-sets are identified by a comma symbol (COM) as their first symbol.

Ordered-sets are used during link initialization and training as well as during data transfer operations. Specifically 'skip ordered-sets' are used to facilitate lane de-skewing and synchronization of the receiver's local clock with the embedded clock of the received bit stream during data transfer. A skip ordered-set includes a COM symbol followed typically by three SKP symbols. A transmitter periodically inserts skip ordered-sets in the transmitted data stream. These skip ordered-sets allow the receiver the flexibility to reduce the effective incoming data rate by removing a SKP symbol from a skip ordered-set. Conversely, the receiver may increase the effective data rate by inserting a SKP symbol into a received skip ordered-set. Skip ordered-sets are also used to align data across the lanes of a given link, since they are transmitted in all lanes of a link. SKP symbols contain no meaningful data and therefore, the receiver may remove them at any stage.

The output of lane de-skew circuit 110 is provided to an elastic buffer 112. Buffer 112 may take the form of a first-in, first-out buffer (FIFO) that may be written to, and read from using independent write and read clocks. Buffer 112 is controlled by buffer control logic 116, clocked from a local clock generator 114 and clock recovery circuit 104. Decoder 118 receives a 10-bit, 8B/10B encoded symbol from elastic buffer 112 and produces an 8-bit decoded data symbol.

A descrambler 120 receives 8-bit output of decoder 118, descrambles the data, and outputs the descrambled data to the rest of the receiver subsystem. The transmitter scrambles data to prevent discrete analog frequencies from appearing on the differential transmission line. After the bits are received at the receiver, descrambler 120 is used to restore the data to the original form.

Serial-to-parallel converter 106, lane de-skew circuit 110, and buffer control logic 116, are all clocked by a symbol clock derived from the received serial stream. Specifically, clock recovery circuit 104 extracts the receive clock embedded in the 8B/10B stream using a phase locked loop (PLL) circuit. The center frequency is 2.5 GHz. The PCI Express standard requires the clock to be with in 300 ppm of the center frequency. Clock recovery circuit 104 further generates a symbol clock, used to clock symbols into and out of the various blocks, at 1/10 the extracted bit clock, as symbols are each 10 bits wide.

A further local clock generator 114 supplies a local reference clock to buffer control logic 116, decoder 118, buffer 112 and other blocks. Local clock generator 114 generates the local clock for the operation of the PCI Express device physical layer operations. In PCI Express, the local clock is kept within 300 ppm of 2.5 GHz. As mentioned, the symbol clock is derived by dividing the generated 2.5 GHz±300 ppm clock by 10 as each symbol is 10 bits wide.

Elastic buffer 112 and its buffer control logic 116 thus make use of two different clocks. Symbols are written to the elastic buffer 112 using the recovered receive symbol clock. Symbols are read out of the elastic buffer using the local clock. In other words, elastic buffer 112 and buffer control logic 116 operate in a dual clock domain.

Since the PCI Express specification requires that each clock's frequency is 2.5 GHz±300 ppm, the two clocks may be as much as 600 ppm apart. Elastic buffer 112 is used to synchronize the two.

Buffer control logic 116 manages the operation of the FIFO forming elastic buffer 112 and the insertion and removal of clock compensation symbols. Buffer control logic 116 maintains a read pointer that identifies the location of the oldest written but not yet read data within the FIFO, and a write pointer that points to the location of the oldest read but not yet written data. In other words, the write pointer identifies the current location to write to, and the read pointer identifies the current location to read from. As data is written into the FIFO the write pointer is incremented and as data is read from the FIFO the read pointer is incremented. If data is being written into the FIFO, and read out at different rates, an overflow or an underflow may occur. An underflow is said to occur if the FIFO is read when it is empty. Similarly, an overflow is said to occur if the FIFO is written to when full. Underflows and overflows may be prevented by monitoring the read and write pointers. If the values of the read pointer is approaching the write pointer, then the buffer is becoming empty and buffer control logic 116 may detect an underflow is likely. Conversely, if the write pointer is increased to within a threshold of the read pointer then the buffer is becoming full and buffer control logic 116 may detect that an overflow is likely.

Elastic buffer control logic 116 uses clock compensation symbols in the form of skip ordered-sets to prevent overflows as well as underflows. A skip ordered-set is transmitted along each lane of a link, once every 1180 to 1538 symbols. If the number of locations in the FIFO containing data that have not been read, increases above a given threshold overflow is imminent.

Skip ordered-sets are detected by buffer control logic 116 using simple combinatorial logic. In normal operation, SKP symbols are effectively removed from the FIFO of buffer 112 by buffer control logic 116. This may, for example, be accomplished by buffer control logic 116 not incrementing the write pointer for SKP symbols. The frequency of SKP symbols within the arriving stream, and the proximity of read and write clocks for the elastic buffer ensures that overflow does not occur.

On the other hand, if underflow is imminent (i.e. if the read and write pointers are within a threshold distance of one another) buffer control logic 116 need not remove SKP symbols. In this way, the FIFO is replenished with SKP symbols that may be removed downstream. Of course, if the possibility of underflow is chronic, mere non-removal of SKP symbols may not be sufficient. As such, buffer control logic 116 may insert SKP symbols, after a skip ordered-set. The insertion may be done using a multiplexer. Alternately, a SKP symbol may effectively be inserted by not advancing the read pointer after a SKP symbol in the FIFO is read out. On the next read cycle, another SKP value will be read as the read pointer value is still the same, thereby effectively inserting a SKP symbol.

Thus, while an incoming skip ordered-set (into buffer 112) is typically made up of a COM symbol followed by three SKP symbols, a corresponding COM symbol followed by zero to four SKP symbols may leave buffer 112, depending on whether a SKP was inserted or removed.

Unfortunately, buffer control logic 116 must be able to perform these functions in a dual clock domain. The detection and removal of SKP symbols by buffer control logic 116 is performed using the recovered clock, while addition of SKP symbols is done using the local clock. Moreover, SKP may only be added to skip-ordered sets. These requirements make the design of the buffer 112 and control logic 116 complicated, which leads to difficulties in meeting stringent timing constraints, more gates being used and a larger silicon area requirement for elastic buffer control circuit.

Figure 2:
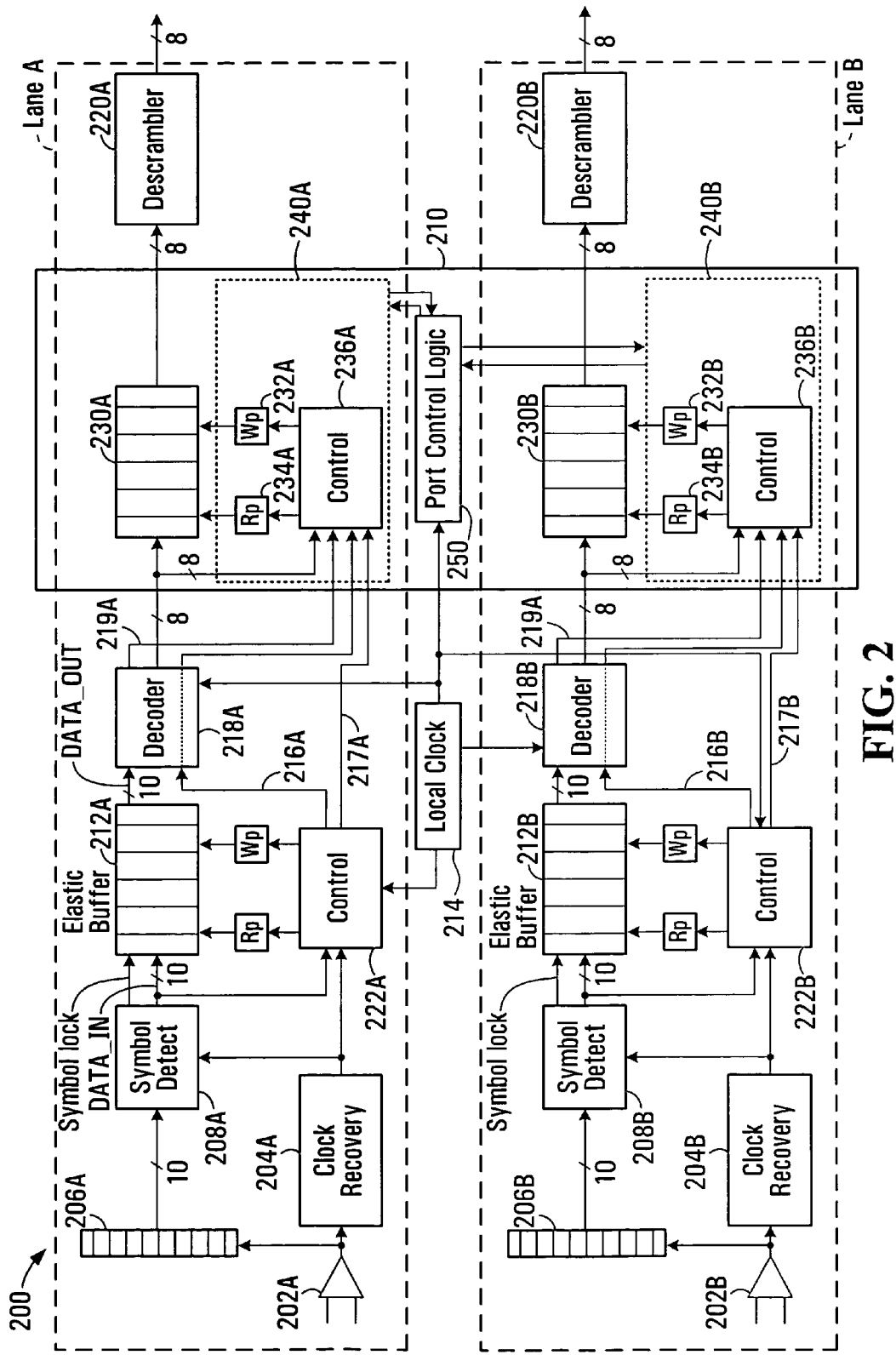
FIG. 2 is a block diagram of a receiver subsystem exemplary of an embodiment of the present invention.

FIG. 2 thus depicts a receiver subsystem 200 for a PCI Express compliant device exemplary of an embodiment of the present invention. Receiver subsystem 200 includes, a plurality of lanes of which just two (lane-A and lane-B), are illustrated for clarity.

Receiver subsystem 200 typically forms part of a PCI Express compliant device, like a computing or peripheral expansion card.

Each receiver subsystem 200 includes differential receiver 202A or 202B (individually and collectively differential receivers 202); receive clock recovery circuits 204A, 204B (individually and collectively clock recovery circuits 204); and serial-to-parallel converters 206A, 206B (individually and collectively serial-to-parallel converters 206) serving the same purpose as their counterparts in subsystem 100. That is, differential receiver 202, receives a conventional PCI express compliant serial stream, and is interconnected with a receive clock recovery circuit 204. Serial-to-parallel converter 206 converts the bit stream to a 10 bit symbol stream.

Symbol detectors 208A, 208B (individually and collectively symbol detectors 208), detect symbol boundaries and control serial-to-parallel converter 206. Symbol detector 208 checks for a 10 bit comma symbol (COM) in ten possible locations using a 10-bit sliding window over twenty buffered bits of incoming data. If a COM is detected, the location of the starting bit in the buffer is noted, and if a subsequent COM is detected again in the same location, a 'symbol lock' signal is generated by symbol detector 208.

A receive clock is recovered from the 8B/10B stream by clock recovery circuit 204, and a local clock generator 214 provides the local clock.

Lane de-skew circuit 210 includes a buffer that may be formed as a first-in-first-out (FIFO) buffer associated with each lane. Specifically, each lane de-skew circuit 210 includes FIFO 230A or 230B (individually and collectively FIFO 230). Of course, these buffers could be formed without using a FIFO, and could instead be formed using a linear feedback shift register, or other similar structure, known to those of ordinary skill.

Each lane de-skew circuit 210 further includes lane control logic (LCL) blocks 240A, 240B (individually and collectively LCL 240). Each LCL block 240 includes write pointer 232A or 232B (individually and collectively write pointer 232), control logic 236A, or 236B (individually and collectively control logic 236); and read pointer 234A or 234B (individually and collectively read pointer 234).

Each FIFO 230 may be 10 bits wide (8 bits for data, 1 bit for control/data character indication and 1 bit for error indication) and 9 words deep. There may be one FIFO 230 for each lane.

Elastic buffers 212A, 212B, (individually and collectively elastic buffers 212), like elastic buffer 112 include a FIFO or similar structure that may be written to, and read from using different write and read clocks. Buffer control circuits 222A, 222B (individually and collectively buffer control circuits 222), control reading and writing from and to elastic buffer 212. Clock recovery blocks 204A, 204B (individually and collectively recovered clocks 204) provide clocks used to write to elastic buffers 212, while local clock 214 is used to read from elastic buffers 212. However, buffer control circuit 222 unlike control logic 116, does not insert clock compensation symbols.

Buffer control circuit 222 maintains a read pointer (rp) that contains the oldest written but not yet read location in an associated elastic buffer 212 and a write pointer (wp) that contains the oldest read but not yet written location within the buffer 212. When data is written into the buffer 212, the write pointer is incremented by one. Conversely as data is read from the buffer 212, the read pointer is incremented by one.

In the ideal case, with no clock jitter, the read pointer and write pointer would be constantly separated by about half the FIFO size. Unfortunately, as the read clock and write clock typically differ slightly in frequency, the two pointers may drift apart or get closer together. Over time, the pointers could collide and give rise to overflow or underflow.

To prevent underflows and overflows, buffer control circuit 222 compares the read pointer (rp) and write pointer (wp) of the associated elastic buffer 212. The values of wp and rp are in the range 0 to N−1 where N is the size of buffer 212. If the values of the pointers are ever the same, that is rp=wp, buffer 212 is empty and an underflow is said to occur. However if rp=wp+1, then the buffer is full and an overflow is said to occur. To detect overflow as described, buffer control circuit 222 leaves at least one location in buffer 212 empty. If a write operation is attempted into the last free location in elastic buffer 212, then rp=wp+1 holds, indicating an overflow.

Buffer control circuit 222 prevents overflows and underflows. Buffer control circuit 222 may compare if $rp-wp \leq \delta$ where $\delta$ is a positive integer representing a threshold value used to determine if overflow is imminent. Conversely $wp-rp \leq \delta$ may be evaluated to test if underflow is imminent or likely. The comparison is performed modulo N.

In the depicted embodiment, each buffer control circuit 222 maintains signals on associated control lines 216A, 216B, (individually and collectively lines 216) and 217A, 217B (individually and collectively lines 217). As will become apparent, control lines 216 are used to signal that to subsequent blocks (218, 210) that symbols from elastic buffers 212 are intended as placeholders. Line 217 signals a COM or SKP symbol at the output of buffer 212. Lines 216 and 217 are interconnected with de-skew circuit 210.

Local clock generator 214 generates the local clock with a frequency value of 2.5 GHz±300 ppm. Clock dividers may be used as needed to derive slower local clocks such as the local symbol clock.

Decoders 218A, 218B (individually and collectively decoders 218), perform 8B/10B decoding of the symbols to extract 8 data bits from each 10-bit encoded symbol. Decoder 218 also includes an error detector and flags any errors that are encountered as it decodes the incoming symbols. Decoder 218 may detect code violation errors and disparity errors. Code violation errors result when invalid 10-bit symbols are received (such as symbols containing more than six 1's or more than six 0's). Disparity errors are detected when the number of 0's and 1's received differ by more that the amount allowed by 8B/10B encoding. The 8B/10B encoder ensures that after any transmitted symbol, the difference in the total number of 1's and 0's (called the running disparity) is at most two. For example, if two consecutive symbols each containing more 1's than 0's (or vice versa) are received, then a disparity error is detected. For either code violation or disparity errors, an error indication is flagged using line 219A and 219B (individually and collectively lines 219) which are connected to de-skew circuit 210. Decoder 218 receives its data input from the output of elastic buffer 212, and forwards its output data to lane de-skew circuit 210.

Descramblers 220A, 220B (individually and collectively descramblers 220) descramble the scrambled data received from lane de-skew FIFOs 230. Descramblers 220 reinitialize upon receipt of COM symbol. The COM symbol is present in all ordered sets, and is used for alignment of data across all lanes of a link. As described below, upon successful alignment, all descramblers 220 read the COM symbol simultaneously and reinitialize.

Elastic buffer control circuit 222 makes use of skip ordered-sets within the serial stream to prevent overflows that might occur as a result of the differences in the clocks used to write to, and read from elastic buffer 212 respectively. If the write clock frequency is persistently higher than the read clock frequency, buffer 212 may become full and overflow occurs.

When the write pointer advances faster than the read pointer and comes within a threshold of the read pointer (that is, $rp-wp \leq \delta$), overflow is likely/imminent. If overflow is likely, buffer control circuit 222 removes a SKP symbol from a skip ordered-set received in elastic buffer 212. To remove a SKP symbol, buffer control circuit 222 compares symbols at the output of elastic buffer 212 to a COM-SKP sequence (one COM followed by one SKP symbol), using a simple comparator. A skip ordered-set from the transmitter typically contains a COM followed by three SKP symbols. A skip ordered-set (enumerated as $COM-SKP_1-SKP_2-SKP_3$) at the input of buffer 212 is depicted as DATA_IN in FIGS. 3A-3C.

Figure 3A:
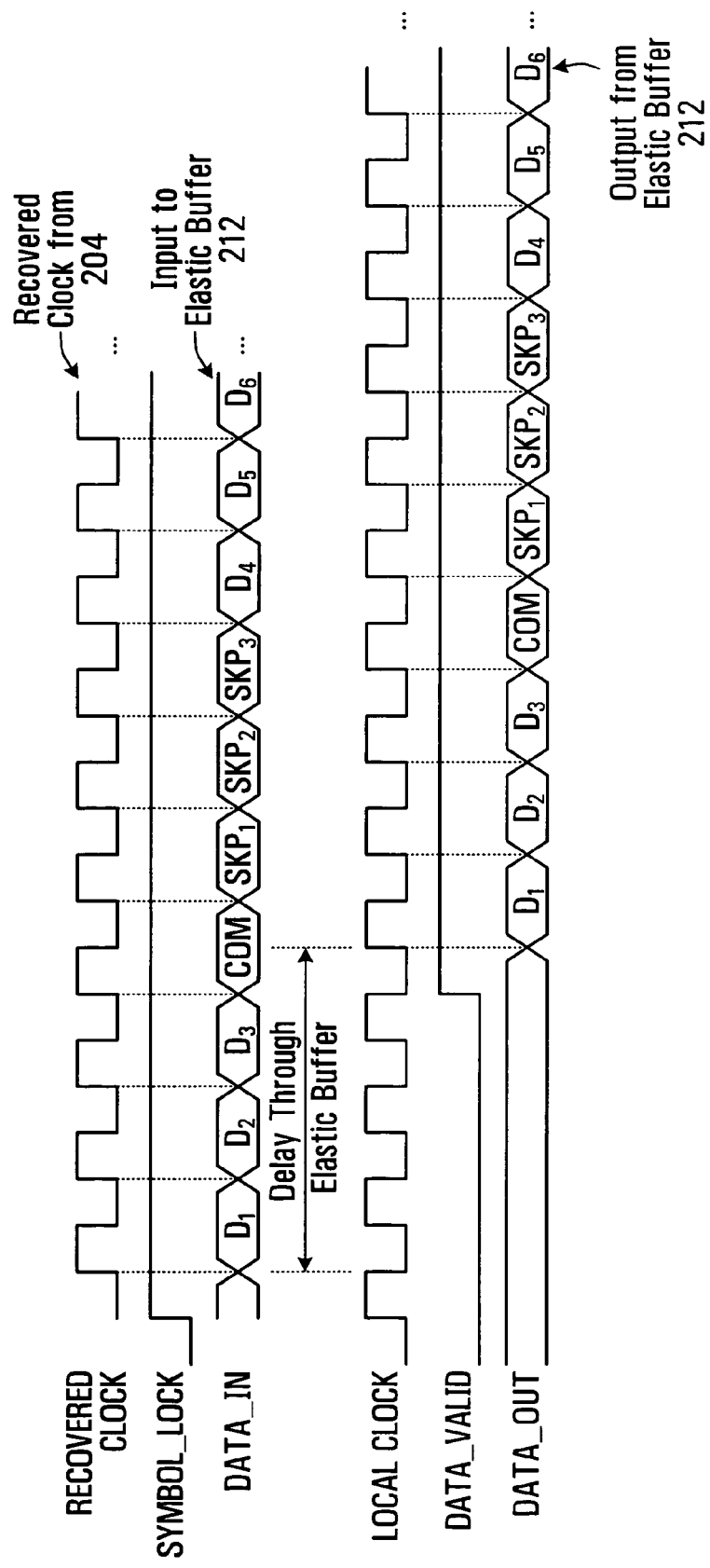
FIGS. 3A-3C are timing diagrams for the data input and the data output signals of an elastic buffer shown in FIG. 2.
Figure 3B:
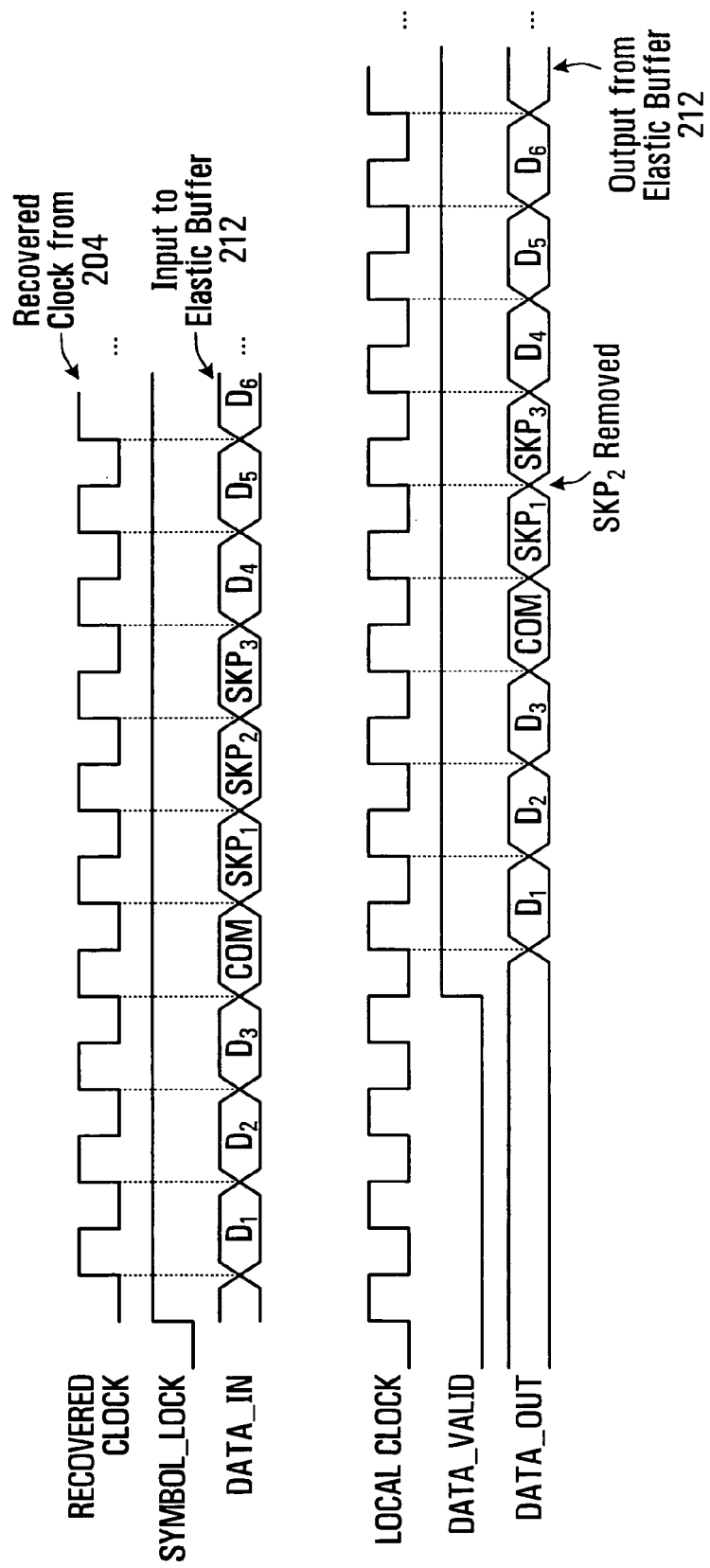
Figure 3C:
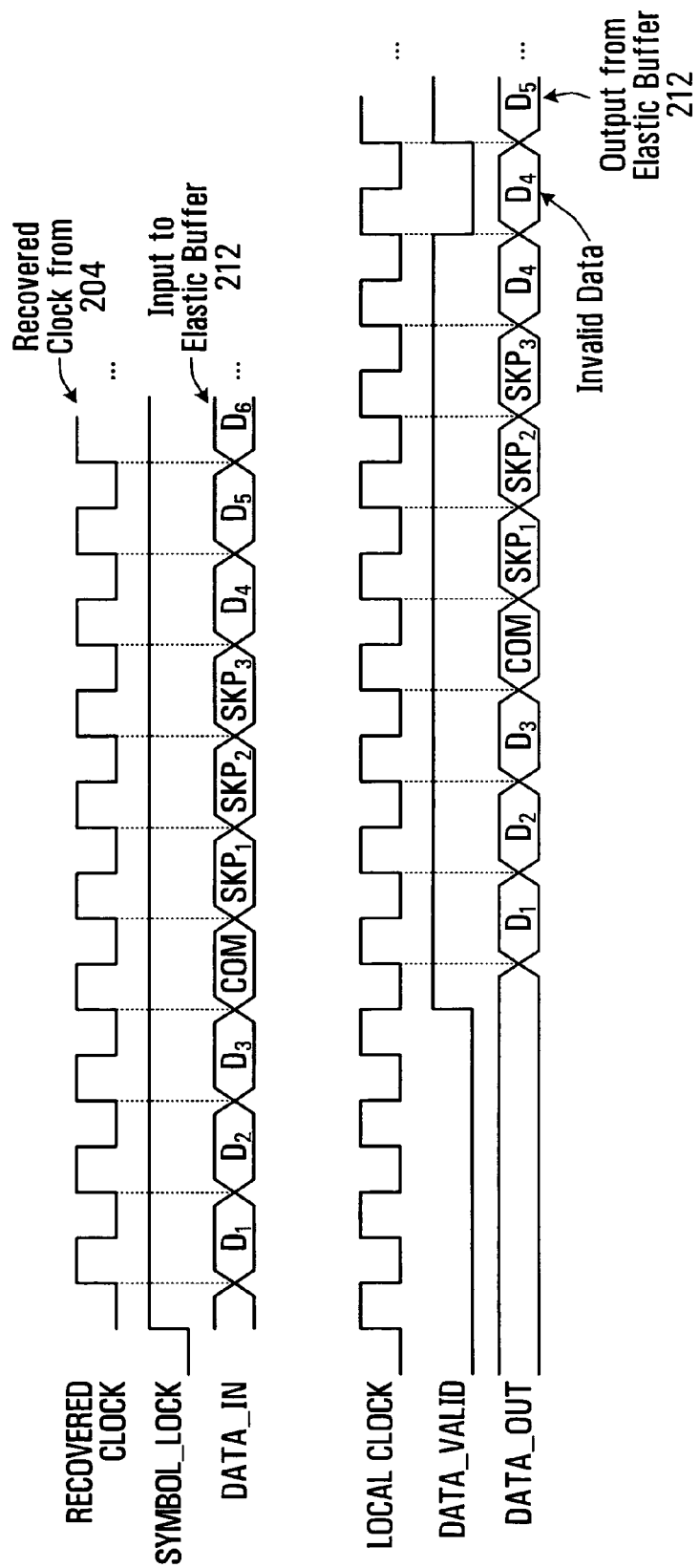

If neither underflow nor overflow is imminent (rp−wp≥δ), the output of buffer 212 is as depicted in FIG. 3A. If buffer control circuit 222 detects a COM-SKP sequence, and overflow is imminent (rp−wp≤δ) then it advances read pointer rp to skip the next SKP symbol (SKP$_2$) in the buffer as shown in FIG. 3B. This removes the second SKP symbol (SKP$_2$) from the symbol stream going to decoder 218. In FIGS. 3A-3C, DATA_VALID signal corresponds to line 216 while DATA_OUT refers to the data output lines of buffer 212.

In an alternate embodiment, to remove a SKP symbol, buffer control circuit 222 may compare incoming data with a SKP symbol, using a simple comparator and if a match is found, de-assert the write request signal input into the elastic buffer 212 (which prevents data on the data input lines from being written to the buffer) and keep the value of the write pointer unchanged. This effectively removes a SKP symbol while leaving the state of the elastic buffer unchanged.

As noted, the frequency of skip ordered-sets in the incoming symbol stream (skip ordered-sets must be transmitted at least once every 1538 symbol period), and the fact that the read and write clocks are at most 600 ppm apart means that buffer control circuit 222 to remove of a SKP symbol is sufficient to prevent overflow. In the depicted embodiment, buffer 212 is large enough to accommodate the maximum size of the transaction layer packet (TLP) as specified in the PCI Express specification, and additionally the maximum number of skip ordered sets (up to three) that may be inserted during the transmission of a TLP of maximum size.

If overflow is not imminent, SKP symbols are placed in elastic buffer 212. Unlike buffer control logic 116 in FIG. 1, buffer control circuit 222 does not attempt to remove SKP symbols unless overflow is imminent.

If the read clock frequency is persistently higher than the write clock frequency, buffer 212 may become empty and underflow occurs. When read and write pointer foreshadow underflow (wp−rp≤δ), buffer control circuit 222 de-asserts signal on line 216 (DATA_VALID in FIG. 3C) and also does not advance read pointer (rp) 234. In FIG. 3C, de-asserting signal on line 216 (DATA_VALID) indicates that the data at the output of elastic buffer 212 (DATA_OUT) has no significance in the stream—i.e. it is invalid and is provided only as a placeholder symbol. The read pointer is not incremented by buffer control circuit 222 while signal on line 216 is de-asserted. The signal on line 216 is an indicator of whether a symbol provided at the output of elastic buffer 212 is a placeholder symbol. Buffer control circuit 222 keeps signal on line 216 de-asserted and the read pointer pointing to the same location until enough data is written into the associated elastic buffer 212 such that under flow is not imminent. Once the write pointer is incremented sufficiently (that is, when the inequality wp−rp≤δ no longer holds) signal on line 216 is again asserted and decoder 218 starts reading valid data and the read pointer is incremented as each valid data is read out.

In an alternate embodiment, underflows and overflows may be detected by buffer control circuit using a counter. The counter may be a simple ring counter. When data is written to the FIFO, the counter is incremented. When data is read from the FIFO, the counter is decremented. The counter would thus count the number of symbols available for reading in the elastic buffer 212. If the counter is 0, the buffer is empty, signifying an underflow on the next read. On the other hand, if the counter is incremented to the maximum value N (the size of the FIFO buffer) buffer control circuit 222 could detect an overflow on the next write.

Unlike in elastic buffer 112, a signal on line 216 is used to handle underflow in the exemplary embodiment of FIG. 2, without the need to insert SKP symbols into the symbol stream.

Control logic 236 of LCL 240 controls the write request signal to FIFO 230, and establishes whether or not incoming data is written to FIFO 230. If line 216 is de-asserted, control logic 236 de-asserts write request signal preventing the placeholder from being written to FIFO 230.

As noted, symbols from buffer 212 are decoded prior to being provided to FIFO 230. As such, for each symbol (e.g. 10 bit) read from buffer 212, FIFO 230 actually receives a corresponding (e.g. 8 bit) symbol. In the presence of an 8B/10B decoder the correspondence is an 8B/10 relationship. However, in the absence of such a decoder, the correspondence could be otherwise. For example, if 8B/10B encoding were not used, the symbols received at FIFO 230 would be identical to those in buffer 212.

In any event, the signal on line 216 passes through a flip-flop in decoder 218. This ensures that both the placeholder symbol and the invalidity indication signal on line 216 arrive at de-skew circuit 210 in the same clock cycle, after a one clock cycle delay through the decoder circuit 218. Consequently data associated with a de-asserted signal on line 216 is recognized as a placeholder by control logic 236 and is not written to FIFO 230.

As should now be apparent, elastic buffer 212 and FIFO 230 in lane de-skew circuit 210 co-operate to synchronize the incoming received clock, with the local clock and to remove clock jitter. Advantageously, lane de-skew circuit 210 is also able to correct the lane-to-lane skew that may result.

To this end, lane de-skew circuit 210 further aligns symbols across all lanes, like its counterpart lane de-skew circuit 110 in FIG. 1. In the depicted embodiment, lane de-skew circuit 210 operates on 8 bit symbols, and not their 10 bit counterparts. Decoder 218 takes 10 bit symbols as an input and decodes the corresponding 8 bit symbols.

As noted above, symbols that are transmitted concurrently along multiple lanes at the transmitter are not always received at lane de-skew circuit 210 simultaneously. Therefore appropriate delays may need to be introduced in some of the lanes to align at the receiver, symbols that were transmitted together. Accordingly, each lane has an associated FIFO inside de-skew circuit 210 to which the symbol stream of each lane is written. As illustrated below, lane de-skew circuit 210 periodically adjusts the read pointers of the FIFOs 230 so that symbols corresponding to concurrently transmitted symbols are read from each FIFOs 230 in the same clock cycle.

Advantageously, in addition to de-skewing lanes, lane de-skew circuit 210 prevents underflows in its buffers, reduces latency in the de-skewing operation and may save power in operation.

Figure 4:
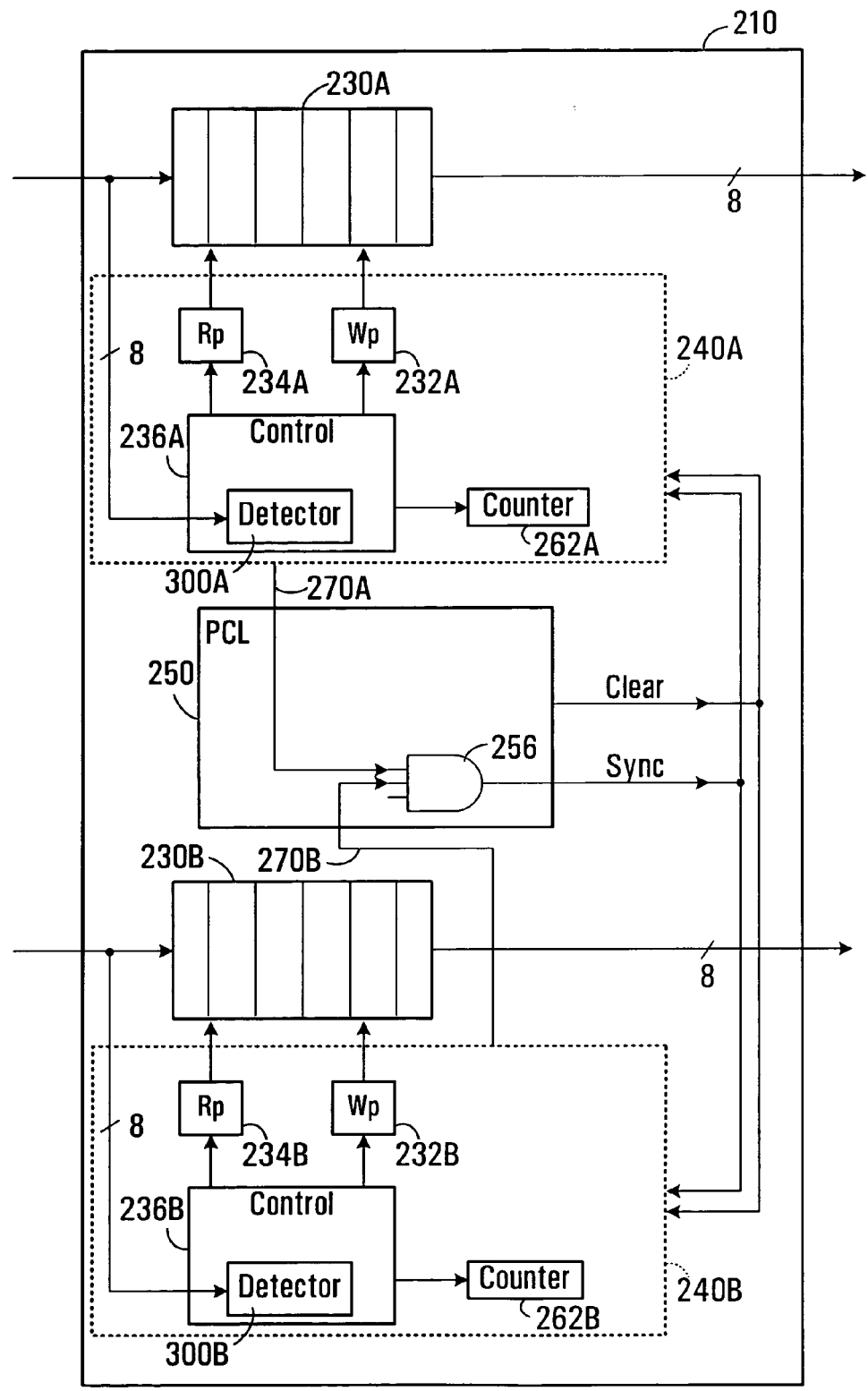
FIG. 4 is a schematic diagram of a lane de-skew circuit forming part of the receiver subsystem of FIG. 2.

FIG. 4 is a more detailed schematic of de-skew circuit 210 including additional signals between the link control logic called, port control logic (PCL) 250 and LCL 240. In FIG. 4 just as in FIG. 2 only two lanes are shown. However, the description is illustrative of multi-lane alignment.

As illustrated, each LCL 240 includes write pointers 232, read pointers 234 and detection circuits 300A or 300B (individually and collectively detection circuits 300). Detection circuits 300 provide a signal on an associated line 270A, 270B indicating that a sequence to be detected has been detected. Further, counters 262A, 262B (individually and collectively lines 270 and counters 262), are used to track the location of a detected symbol sequence (e.g. COM-SKP, or COM-TS1) within FIFO 230.

Port control logic (PCL) 250 contains a circuit (comprising AND gate 256) which determines when all lanes have detected a specific symbol pattern. PCL 250 is interconnected with all of the LCL circuits.

The lane alignment mechanism will be explained below using an 8 bit per symbol "com-skp" sequence (corresponding to a 10 bit per symbol COM-SKP sequence) corresponding to a skip ordered-set transmitted along all lanes, as an example. Hereinafter, lower case symbol names (e.g. "com") are used to denote the 8-bit decoded symbols while upper case symbol names (e.g. COM) are used to refer to 10-bit symbols. "com-skp" sequences are used as periodic alignment symbols by de-skew circuit 210. The description of the alignment mechanism similarly applies when using a "com-ts1", "com-ts2", or "com-fts" sequences (corresponding to a training sequence 1, training sequence 2, and the fast retrain sequence respectively) in FIFO 230 for alignment.

Specifically, after "com-skp" sequence is detected by control logic 236A and written to FIFO 230A, counter 262A is started by LCL 240A. Similarly when a "com-skp" pattern is received in FIFO 230B, counter 262B is started by LCL 240B. These counters are incremented as each new symbol is written to the respective FIFO 230. As well, a signal identifying the detection of a "com-skp" sequence is asserted on line 270. Thus, after n symbols are written into FIFO 230A (subsequent to "com-skp"), counter 262A is incremented to a value n. Labeling the first location as location 0, counter 262A thus holds the address (n) of the COM symbol in FIFO 230A.

When PCL receives an asserted signal on lines 270 from all lanes of a link, it signals each lane to align by providing a signal on line 272. Each LCL uses signal on line 272 to advance read pointer 234 of each lane's FIFO 230 to the value of each lane's corresponding counter 262. Counter 262 corresponds to the location in FIFO 230 containing the "com" symbol. Thus, the read pointer of each FIFO now points to the location of the "com" symbol and the alignment is achieved. Thus, on the next clock cycle after a synchronization signal on line 272 is generated, all descramblers should read a "com" symbol.

The "com" symbol is used to reset the descramblers 220. As such, de-skew circuit 210 ensures that all descrambler read the "com" symbol in the same clock cycle.

The same alignment process may be used to de-skew using the TS1, TS2 or FTS ordered-sets. The same circuit may be used to detect symbol sequences COM-TS1, COM-TS2, or COM-FTS and initiate alignment when all lanes detect the same sequence from the same ordered-set.

False alignments may be initiated as a result of false code symbols (such as COM, SKP or TS1), which may be observed from time to time by the lane de-skew circuit 210, due to noise corrupting the value of data symbols. This is undesirable as false de-skew operations may cause unnecessary latency and potential data loss.

Conveniently, LCL 240 of individual lanes thus may use additional alignment criteria before indicating to PCL 250 that a "com-skp" sequence had been detected, even after a "com-skp" sequence is written into the lane FIFO 230.

Specifically, upon detecting the "com-skp" sequence, LCL 240 further examines error line 219 coming from the associated decoder 218. As noted, error line 219 indicates an error in 8B/10B decoding (code violation error or disparity error caused by noise). Error line 219 may thus be used to prevent false alignments as a result of noise corrupted data symbols mimicking a COM bit pattern. Thus, if error line 219 is asserted while "com-skp" is received into FIFO 230A, LCL 240A does not indicate the detection to PCL 250 (i.e. the associated line 270 is de-asserted).

In addition to line 219, LCL 240 further examines line 217. As noted the signal on line 217 is used to indicate if a data or control symbol is observed at the output of buffer 212A. In order to avoid de-skewing in the presence of multiple "com-skp" sets LCL 240A does not indicate the detection to PCL 250 (i.e. keeps the signal on line 270A de-asserted) until signal on line 217A is de-asserted. Use of a signal on line 217A reduces signal latency through the decoder 218A.

Further, LCL 240 may ensure that data is not lost during alignment. For example, if the read pointer 234A of FIFO 230A points to the location of "com" in the "com-skp" sequence before LCL 240B has detected "com-skp", LCL 240A may delay the reading out of the "com" symbol until LCL 240B has also detected "com-skp". While waiting on LCL 240B to also detect a "com-skp" sequence, LCL 240A may keep its read pointer (which points to "com" in FIFO 230A) from advancing and preferably supply "skp" symbols to descrambler 220A. When LCL 240B finally detects "com-skp", PCL 250 asserts line 217, and both descramblers 220A, 220B would simultaneously read "com" to align the lanes.

Alignment operations correct misalignment of lanes of up to a finite number of symbol durations. The PCI Express specification requires symbol alignment capabilities for misalignments of up to 5 symbol times.

As shown in FIG. 4, the inputs into the AND gate 256 from each lane of a port, by way of lines 270A, 270B, that indicate whether the "com-skp" pattern is detected. If all lanes detect a pattern and lines 270A, 270B to gate 256 are all asserted, a synchronization signal on line 272 is produced as the output of logic gate 256 and provided to each LCL 240.

If a clear signal on line 258 is received by LCL 240, then the "com-skp" detection process is reinitialized.

PCL 250 may further impose additional conditions on the generation of the synchronization signal on line 272. PCL 250 may further monitor the link training and status state machine (LTSSM) of the PCI Express link and only allow alignment signal on line 270 to be generated if the link state is appropriate. For example, in link state "L0", the PCL allows COM-SKP pattern to initiate alignment. Since COM-TS1 and COM-TS2 are used during link training (not in "L0" state), they are prevented from initiating alignment when the link is in "L0" state.

The PCI Express standard permits back to back skip ordered-sets to be transmitted. Skip ordered-sets may also have four or more consecutive SKP symbols. SKP symbols are not needed to construct the desired higher layer transaction layer packet (TLP) or data link layer packet (DLLP). Therefore the symbols should be removed before TLPs or DLLPs are assembled.

If FIFOs 230 of the different lanes contain different numbers of SKP symbols following a COM, then additional circuitry and processing time may be required to align data in multiple lanes in the presence of a variable number of SKP symbols in each FIFO 230. This additional processing may increase latency significantly. Exemplary receiver 200 allows data alignment and reduces latency by allowing only one "skp" symbol following any "com" symbol to be stored in each FIFO.

Figure 5A:
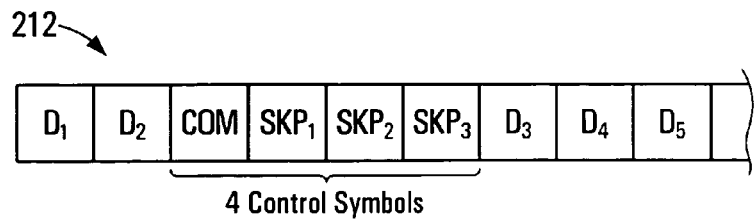
FIGS. 5A-5D are block diagrams of the contents of the elastic buffer and the resulting contents of the de-skew buffer of a lane in the receiver subsystem depicted in FIG. 2.
Figure 5B:
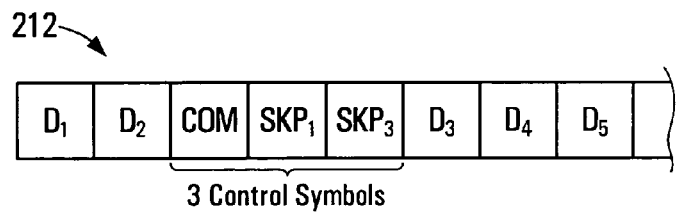
Figure 5C:
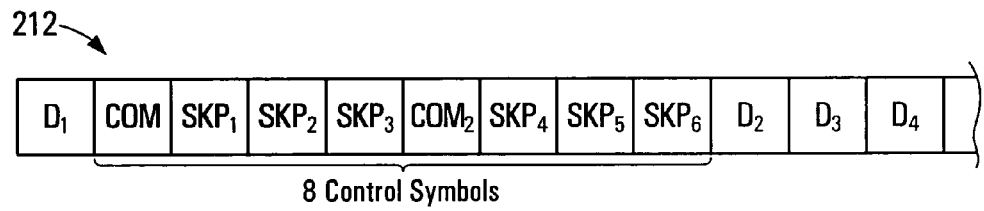
Figure 5D:
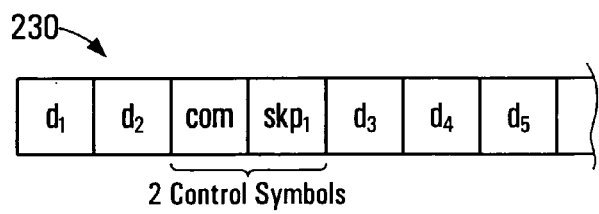

Diagrams of the contents of de-skew FIFO 230, corresponding to multiple possible contents of elastic buffer 212, are shown in FIGS. 5A-5D. FIGS. 5A, 5B and 5C show possible contents of the elastic buffer 212. FIG. 5D shows the contents of de-skew FIFO 230 after symbol streams in buffer 212 are received in FIFO 230. Specifically, LCL 240 allows a "com-skp" sequence (one "corn" symbol followed by one "skp" symbol) into buffer 230. However, after allowing two control symbols, buffer control 236 waits for a signal on line 217 to be de-asserted. Signal on line 217 is asserted by buffer control circuit 222 whenever predetermined symbol, such as a COM or SKP symbol is detected at the output of buffer 212. If COM is followed by several SKP symbols, or a new skip ordered-set is transmitted, then signal on line 217 remains asserted. Signal on line 217 may thus be used by buffer control 236 to remove all subsequent consecutive "com" and/or "skp" symbols following the first "com-skp" sequence allowed into FIFO 230. Thus all subsequent "com" or "skp" symbols that are received while signal on line 217 is asserted are not written into FIFO 230 and are effectively discarded.

As illustrated, whether a skip ordered-set with three SKP symbols (FIG. 5A), or skip ordered-set with two SKP symbols (FIG. 5B) or back-to-back skipped ordered-sets (FIG. 5C) are transmitted to lane de-skew circuit 210, only one COM symbol and one SKP symbol are received into FIFO 230 (FIG. 5D).

Retaining the first symbol (COM) of an ordered-set as a reference symbol, there is at least one symbol to read in each FIFO 230 after aligning the "com" symbols, thus preventing underflow. As discussed, when aligning the lanes, the read pointer 234 of each FIFO 230 moves to the location containing the COM symbol. On the next read cycle, each descrambler 220 for each lane reads the "com" symbol.

Prior to alignment, FIFO 230 of each lane in de-skew circuit 210 contains at least two symbols (e.g. "com" and skp). After the signal for alignment is received by each lane, the read pointer of each FIFO 230 points to the "com" symbol in the FIFO. Should signal on line 216 be de-asserted now (at most once between two skip ordered-sets), control logic 236 may simply advance read pointer 234 only. Control logic 236 prevents the invalid data from being written into FIFO 230 by de-asserting the write request signal and the write pointer 232 is not advanced. However, since there are two symbols (COM and SKP) to read in FIFO 230, descrambler 220 continues to read data from FIFO 230. Since the de-assertion of the signal on line 216 happens at most once between any two ordered-sets (hence only once between alignment operations), no underflow should arise in FIFO 230.

Comparing now the circuitry of elastic buffer control circuit 222 of FIG. 2 with the elastic buffer control logic 116 of FIG. 1, it should be readily apparent that buffer control circuit 222 is much simpler than the corresponding buffer control logic 116 of FIG. 1. Lane de-skew circuit 210 in FIG. 2 also performs functions designed to complement the elastic buffer 212 and its buffer control circuit 222, in addition to alignment of lanes.

The simplification of buffer control circuit 222 is primarily achieved through the elimination of the circuitry responsible for the addition of SKP symbols. Unlike in conventional buffer designs, it is not necessary for elastic buffer control circuit 222 to insert SKP symbols in the elastic buffer 212 to prevent underflow. Instead, an output signal on line 216 is used by buffer control circuit 222 to indicate to de-skew logic 210 and decoder 218, whether or not its output data is valid. De-asserting line 216 signifies that data is not ready for reading out (clocking out) of elastic buffer 212. By signaling decoder 218 and de-skew circuit 210 to ignore invalid data while keeping the read pointer from advancing, underflow is avoided. When data is later available in elastic buffer 212 for reading, buffer control circuit 222 asserts line 216 again to continue the data flow. Control of a single line 216, which can be asserted or de-asserted as required, is significantly less complicated than employing circuitry that inserts SKP symbols into elastic buffer 212 to prevent underflow.

Conveniently, buffer control circuit 222 only removes incoming SKP symbols if elastic buffer 212 is filling up and overflow is assessed to be imminent. Otherwise, SKP symbols are allowed to pass through elastic buffer 212 by buffer control circuit 222. This is in contrast to the conventional buffer control 112 of FIG. 1 that removes all incoming SKP symbols, based on the differences in the values of the read and write pointers. These simplifications reduce the complexity of the design for buffer control circuit 222. The simplifications allow operation at higher clock frequencies than would not otherwise be feasible.

Since lane de-skew circuit 210 is clocked from a single locally generated source 214, detecting and removing SKP symbols, and inserting SKP symbols when necessary in block 210, instead of buffer control circuit 222 (which operates under dual clock domains) is an advantageous design trade-off.

Moreover, the likelihood of de-skewing operations resulting from noise (e.g. false code symbols such as COM, SKP or TS1), is reduced by using decoded (i.e. 8 bit symbols) for de-skew.

For links that include only single lane (x1 links), the lane alignment mechanism is unnecessary and the entire de-skew circuit may be bypassed. A single lane is often fast enough for many applications including some video transmissions.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A receiver for providing symbols at a second clock rate from an incoming stream comprising an input sequence of symbols clocked at a first clock rate comprising:
   a first buffer for storing symbols in said incoming stream at said first clock rate;
   a first buffer control circuit for providing a re-clocked stream of symbols at said second clock rate, said re-clocked stream comprising symbols of said input sequence stored in said first buffer and placeholder symbols inserted between symbols of said input sequence, and a signal identifying placeholder symbols in said re-clocked stream, wherein said placeholder symbols are inserted in said re-clocked stream when insufficient symbols are stored within said first buffer, wherein said re-clocked stream and said incoming stream are plesiochronous;
   a second buffer for storing corresponding symbols, said corresponding symbols corresponding to said symbols provided from said first buffer;
   a second buffer control circuit for receiving said signal and inhibiting placeholder symbols in said re-clocked stream as identified by said signal from entering said second buffer, and providing said corresponding symbols from said second buffer at said second clock rate.

2. The circuit of claim 1, wherein at least one of said first clock rate and said second clock rate is 2.5 GHz±300 ppm.

3. The circuit of claim 1, wherein said first buffer comprises a first-in-first-out buffer (FIFO) or a linear feedback shift register.

4. The circuit of claim 1, wherein said second buffer comprises a FIFO or a linear feedback shift register.

5. The circuit of claim 1, wherein said first buffer control circuit inhibits predetermined symbols from being stored in said first buffer if said first buffer contains more symbols than a predetermined threshold.

6. The circuit of claim 5, wherein said second buffer control circuit removes symbols corresponding to said predetermined symbols if said second buffer contains more symbols corresponding to said predetermined symbols than a predetermined threshold.

7. The circuit of claim 1, further comprising a decoder for receiving said symbols provided by said first buffer control circuit, and decoding said corresponding symbols therefrom.

8. The circuit of claim 7, wherein said decoder comprises an 8B/10B decoder.

9. The circuit of claim 1, wherein said second buffer forms part of a lane de-skew circuit, used to align receipt of multiple incoming streams.

10. The circuit of claim 1, further comprising a clock recovery circuit for recovering said first clock from said incoming stream.

11. A computing device comprising the receiver of claim 1.

12. A peripheral expansion card, for use in a computing device, comprising the receiver of claim 1.

13. A computing device comprising the peripheral expansion card of claim 12.

14. The device of claim 13, wherein said peripheral expansion card conforms to the peripheral component interconnect express (PCI Express) specification.

15. A method of synchronizing an incoming stream comprising an input sequence of symbols clocked at a first clock rate, to a second clock rate, said method comprising:
receiving said stream in a first buffer at said first clock rate;
providing a re-clocked stream of symbols at said second clock rate, said re-clocked stream comprising symbols of said input sequence stored in said first buffer and placeholder symbols inserted between symbols of said input sequence, and a signal indicating whether each provided symbol in said re-clocked stream is a placeholder symbol, wherein said placeholder symbols are provided in said re-clocked stream when insufficient symbols are stored within said first buffer, wherein said re-clocked stream and said incoming stream are plesiochronous;
storing symbols corresponding to said symbols provided from said first buffer, in a second buffer and based on said signal, inhibiting placeholder symbols in said re-clocked stream from being stored in said second buffer; and
providing said corresponding symbols stored in said second buffer at said second clock rate.

16. The method of claim 15, wherein said first buffer comprises a FIFO or a linear feedback shift register.

17. The method of claim 15, wherein said second buffer comprises a FIFO or a linear feedback shift register.

18. The method of claim 15, wherein predetermined symbols are inhibited from being provided from said first buffer if said first buffer contains more symbols than a predetermined threshold.

19. The method of claim 15, wherein predetermined symbols are removed from said corresponding symbols.

20. The method of claim 15, further comprising receiving said symbols provided by said first buffer control circuit in a decoder, and providing said corresponding symbols from said decoder.

21. The method of claim 20, wherein said decoder comprises an 8B/10B decoder.

22. The method of claim 18, wherein said stream of symbols conform to the PCI Express specification.

23. A circuit for removing skew among a plurality of input symbol streams each input symbol stream including periodic alignment symbols, said circuit comprising:

a plurality of buffers, each used to buffer a sequence of symbols from one of said input symbol streams;
a plurality of read pointers, each identifying a location of one of said buffers from which data is to be read;
control logic to receive a signal identifying the location of placeholder symbols in each of said input symbol streams, and prevent said placeholder symbols from being stored in an associated one of said buffers, such that said placeholder symbols are omitted from said buffered sequence of symbols; and
alignment logic, for aligning said symbol streams by setting said read pointers to concurrently point to said periodic alignment symbols in each of said buffers.

24. The circuit of claim 23, further comprising a status line interconnecting said control logic to said alignment logic wherein said control logic further detects said periodic alignment symbols and sends through said status line, a signal indicative of whether said periodic alignment symbols have been detected on all symbol streams.

25. The circuit of claim 24, wherein said alignment logic aligns said read pointers in response to receiving said signal indicative of whether said periodic alignment symbols have been detected on all symbol streams, from said control logic.

26. The circuit of claim 24 further comprising a decoder wherein an error line interconnects said control logic with said decoder, and said control logic sends said signal indicative of whether said periodic alignment symbols have been detected on all symbol streams, only if said control logic of does not receive an error signal from said decoder via said error line.

27. The circuit of claim 26, wherein said decoder comprises an 8B/10B decoder.

28. A computing device comprising the circuit of claim 23.

29. A peripheral expansion card, for use in a computing device, comprising the circuit of claim 23.

30. The peripheral expansion card of claim 29, wherein said peripheral expansion card conforms to the PCI Express specification.

31. A method of removing skew among a plurality of symbol streams each symbol stream comprising an input sequence of symbols including periodic alignment symbols, said method comprising:
storing each of said plurality of symbol streams in an elastic buffer;
providing to each of a plurality of de-skew buffers, a re-clocked stream of symbols comprising said input sequence of symbols stored in one of said elastic buffers and placeholder symbols inserted between symbols of said input sequence of symbols, at a second clock rate, wherein placeholder symbols are inserted when insufficient symbols are stored within an elastic buffer;
providing with each of said re-clocked streams of stored symbols and placeholder symbols, an associated signal identifying placeholder symbols in each of said re-clocked streams;
buffering symbols within each of said re-clocked streams in one of said plurality of de-skew buffers;
detecting placeholder symbols in each of said re-clocked symbol streams using said associated signal, and preventing said placeholder symbols from being stored in an associated one of said plurality of de-skew buffers, such that said placeholder symbols are omitted from a sequence of symbols stored in each one of said plurality of de-skew buffers;

identifying a location of each of said plurality of de-skew buffers from which data is to be read using a plurality of read pointers each associated with one of said plurality of de-skew buffers; and aligning said symbol streams by setting said read pointers to concurrently point to said periodic alignment symbols in each of said plurality of de-skew buffers in response to an alignment condition being met.

32. The method of claim 31, wherein said alignment condition comprises detecting said periodic alignment symbols in all said symbol streams, and generating a signal indicating that said periodic alignment symbols have been detected in all of said symbol streams.

33. The method of claim 32, further comprising storing locations of said alignment symbols in said de-skew buffers, and transferring said alignment symbols from said stored locations in response to said alignment condition being met.

34. The method of claim 32, wherein said symbol streams comprise encoded symbols, said method further comprising decoding said symbol streams using a decoder ahead of each of said de-skew buffers, and said generating of a signal indicating that said periodic alignment symbols have been detected takes place only when said decoding is error free.

35. The method of claim 31, wherein said plurality of symbol streams conform to PCI Express standard.

36. The method of claim 34, wherein said decoder comprises an 8B/10B decoder.

* * * * *